US012772041B2

(12) United States Patent

Swaminathan et al.

(10) Patent No.: US 12,772,041 B2
(45) Date of Patent: Oct. 20, 2026

(54) METHODS AND SYSTEMS FOR ALTERING USER EQUIPMENT CAPABILITY ON NETWORK SLICES

(71) Applicant: T-Mobile USA, Inc., Bellevue, WA (US)

(72) Inventors: Kavitha Swaminathan, Olathe, KS (US); Christopher Bailey, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 433 days.

(21) Appl. No.: 18/170,458

(22) Filed: Feb. 16, 2023

(65) Prior Publication Data

US 2024/0284162 A1 Aug. 22, 2024

(51) Int. Cl.
*H04W 8/22* (2009.01)

(52) U.S. Cl.
CPC .................................... *H04W 8/22* (2013.01)

(58) Field of Classification Search
CPC ....................................................... H04W 8/22
See application file for complete search history.

(56) References Cited

U.S. PATENT DOCUMENTS 10,667,276 B2 5/2020 Lee et al.
11,071,111 B2 7/2021 Kim et al.
11,388,720 B2 7/2022 Raghunathan et al.
2010/0077179 A1* 3/2010 Stillwell, Jr ........ G06F 15/7867 712/30
2017/0164349 A1* 6/2017 Zhu ....................... H04W 40/20
2019/0239039 A1* 8/2019 Hahn .................. H04W 72/044
2020/0145986 A1* 5/2020 Park .................. H04W 72/0453
2022/0217042 A1 7/2022 Santhanam et al.
2022/0247473 A1 8/2022 Sakhnini et al.
2022/0264469 A1* 8/2022 Zhu ................... H04W 52/0235
2022/0353815 A1* 11/2022 Lin ................... H04W 52/0232
2022/0361118 A1 11/2022 Lee et al.

(Continued)

OTHER PUBLICATIONS

3GPP TS 38.331 V16.3.1 (Jan. 2021) Technical Specification; 3rd Generation Partnership Project; Technical Specification Group Radio Access Network; NR; Radio Resource Control (RRC) protocol specification (Release 16), pp. 1-2,167-170,182-191 (Year: 2021).*

(Continued)

*Primary Examiner* — Joseph A Bednash
(74) *Attorney, Agent, or Firm* — Lee & Hayes, P.C.

(57) ABSTRACT

Methods and systems for altering user equipment (UE) capability on network slices are disclosed. According to an implementation, one or more network slices may be established in a fifth generation (5G) environment. The one or more network slices may correspond to one or more services requested by a user through a UE. During registration, a node B of the 5G network may send an enquiry for capabilities to the UE. Upon receiving the enquiry, the UE may transmit information associated with the capabilities to the node B. In some circumstances, the UE may alter the capabilities on a particular network slice. The UE may transmit a request to the node B, requesting the node B to use altered capabilities on the particular network slice without awaiting or requesting an enquiry to report altered capabilities.

20 Claims, 11 Drawing Sheets

200

(56) References Cited

U.S. PATENT DOCUMENTS

| | | | |
|---|---|---|---|
| 2022/0386108 A1 | 12/2022 | Venkataraman et al. |
| 2022/0417795 A1 | 12/2022 | Lee et al. |
| 2023/0361841 A1 | 11/2023 | Sakhnini et al. |
| 2024/0284164 A1 | 8/2024 | Swaminathan et al. |
| 2024/0334179 A1 | 10/2024 | Suo et al. |
| 2025/0192856 A1 | 6/2025 | Bai et al. |

OTHER PUBLICATIONS

Office Action for U.S. Appl. No. 18/170,442, Dated Jun. 27, 2025, Swaminthan, “Methods and Systems for Reporting User Equipment Capability,” 12 pages.
Office Action for U.S. Appl. No. 18/170,442, Dated Jan. 26, 2026, 10 pages.

* cited by examiner

METHODS AND SYSTEMS FOR ALTERING USER EQUIPMENT CAPABILITY ON NETWORK SLICES

BACKGROUND

Telecommunication networks are widely deployed to provide various services such as voice, data, messaging, video messaging, etc. A core network of a telecommunication network now provides the data service in very high speed and meanwhile, opens up new opportunities for providing the voice service over the internet protocol (VoIP). The telecommunication network also includes multiple access networks that are compatible with various radio access technologies such as Fifth Generation (5G) New Radio (NR), Fourth Generation Long Term Evolution (4G/LTE), High-Speed Data Packet Access (HSDPA)/Evolved High-Speed Packet Access (HSPA+), Universal Mobile Telecommunication System (UMTS), Code Division Multiple Access (CDMA), Global System for Mobile Communications (GSM), WiMAX, Wi-Fi, etc.

A user equipment (UE) connects to an access network through a base station (BS) or a node B (NB) such as an eNode B (eNB) or a gNode B (gNB). Communications between the UE and the base station or the node B are carried on an uplink (UL) and a downlink (DL). Information related to the UE capability is transmitted to the base station or the node B when the UE first connects to the core network. Based on the network conditions, the base station or the node B may determine which capability the UE should use. In a 5G system, the information related to the UE capability is transmitted to the gNB only when it is queried by the gNB. In instances, a gNB that does not support some specific bands, e.g., N66 or B66, will not request the UE to send the capabilities associated with these bands.

In the 5G network, particularly, a network slice may be dynamically created as a virtual end-to-end network over the physical infrastructure of the 5G network. Each slice may serve a particular service type with agreed upon Service-level Agreement (SLA). The identification of a network slice is indicated in a non-access stratum (NAS) information element called single network slice selection assistance information (S-NSSAI). According to 3GPP, five types of the slices/services now can be configured in the slice/service type (SST) field of the S-NSSAI such as Enhanced Mobile Broadband (eMBB), Ultra-reliable low latency communications (URLLC), Massive Internet of Things (MIOT), Vehicle to Anything (V2X), and High Performance Machine Type Communications (HMTC). A UE can support up to eight network slices at a time. When the UE operates on multiple network slices, the capabilities configured by the UE and the gNB during registration may be applied to all the slices with no differentiation. However, as different types of services have different requirements on bandwidth and latency, a unified UE capabilities may not satisfy the individual needs of the various services.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
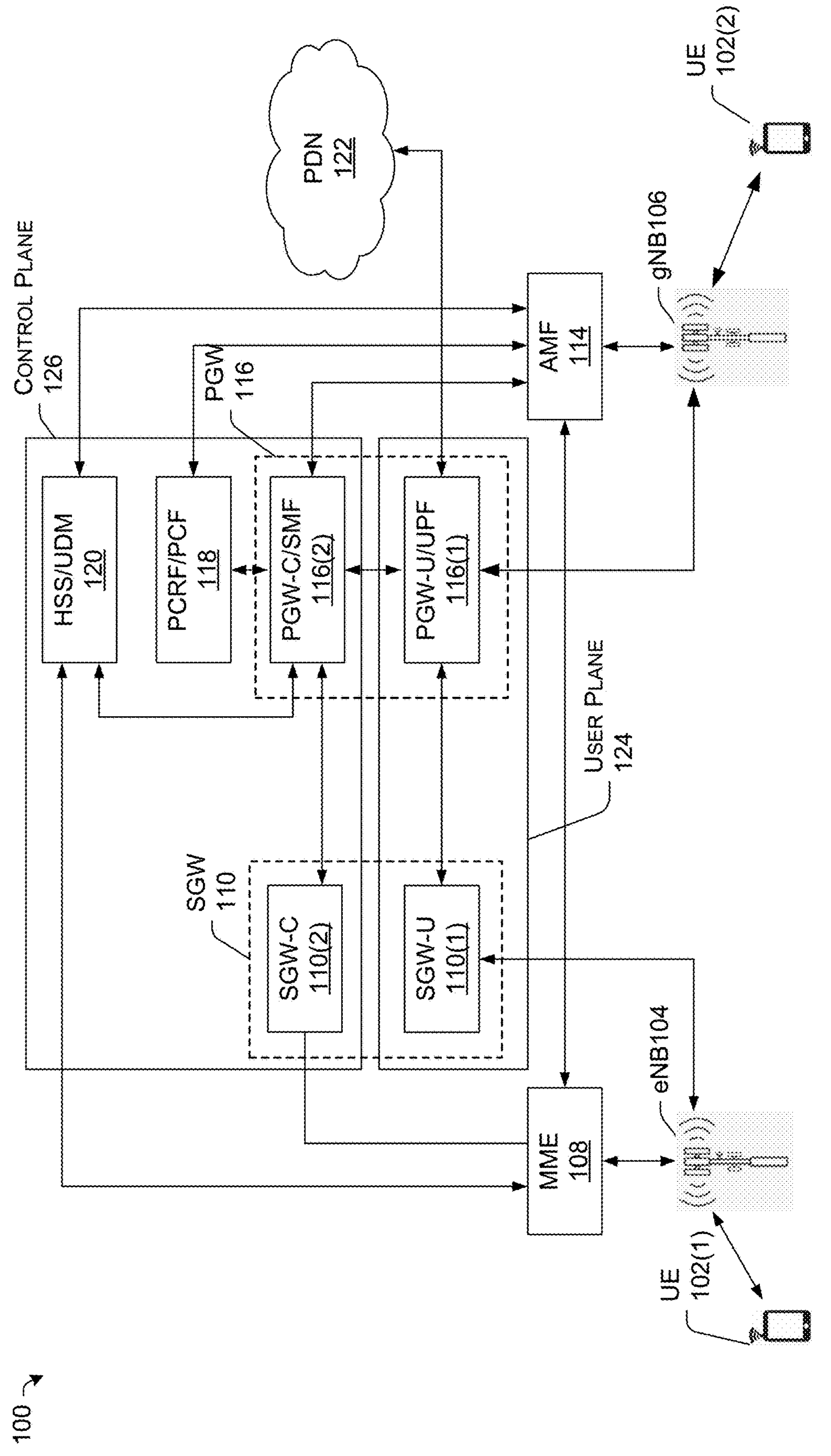
FIG. 1 illustrates an example network scenario, in which methods for reporting UE capability are implemented, according to an example of the present disclosure.

Techniques for reporting UE capability in a 4G evolved packet core (EPC) network, a 5G core network, or a converged 4G/5G core network, are disclosed herein.

In some implementations, a method for reporting UE capability may be implemented on the UE. The UE may be any device that can wirelessly connect to a telecommunication network. In some examples, the UE may be a mobile phone, such as a smart phone or other cellular phone. In other examples, the UE may be a personal digital assistant (PDA), a media player, a tablet computer, a gaming device, a smart watch, a hotspot, a personal computer (PC) such as a laptop, desktop, or workstation, or any other type of computing or communication device. In yet other examples, the UE may include the computing devices implemented on the vehicle including but are not limited to, an autonomous vehicle, a self-driving vehicle, or a traditional vehicle capable of connecting to internet. In yet other examples, the UE may be a wearable device and/or wearable materials, such as a smart watch, smart glasses, clothes made of smart fabric, etc. In further examples, the UE may be a virtual reality or augmented reality goggles or glasses. The UE may support various radio access technologies such as Bluetooth, Wi-Fi, GSM, CDMA, WCDMA, UMTS, 4G/LTE or 5G NR.

In implementations, the UE may first register to a core network of a telecommunication network such as 4G EPC network or 5G core network. Once registered, a communication path between the UE and an external packet data network (PDN) may be established via a node B and multiple network functions/entities. During the registration process, the Node B may send an enquiry message to the UE, requesting for one or more UE capabilities. The UE may send the one or more capabilities, as requested, to the Node B. The Node B may further configure the UE based on the capabilities that the UE has.

In implementations, during the communication, the UE may determine that a preset condition is triggered to update the UE capability with the Node B. The UE may generate a request to update the capability and send the capability update information to the Node B without awaiting the enquiry from the Node B.

In implementations, the preset condition that triggers a UE capability reporting may include a block error rate (BLER) being equal to or greater than a threshold. In some example, the preset condition that triggers a UE capability reporting may include a packet loss rate being equal to or greater than a threshold. In some example, the preset condition that triggers a UE capability reporting may include a change in RAT type, a change in tracking area, or the location of the UE being near an edge of a cell, etc.

In implementations, the UE capability update may include one or more changes related to modulation scheme, power class, bandwidth in use, antenna switching, a granular for beamforming, or downlink multiple input multiple output (MIMO), etc.

As discussed herein, the UE may await the enquiry from the Node B to report the capability information. The UE generally does not proactively report the capability information to the Node B. However, some real-time conditions (e.g., the trigger conditions) may cause signal deterioration. The UE may attempt to resend the data and/or to reconnect to the network, which may drain the battery of the UE fast. In some examples, the UE may request the Node B to send an enquiry so that the updated capability information can be reported. The Node B may further reconfigure the UE according to the updated capability information. In instances, the updated capability information may require less frequent data packet retransmission and thus, reducing the battery consumption. By defining a set of trigger conditions, the present disclosure may enable the UE to voluntarily report the desired capability to the Node B without requesting an enquiry message from the Node B to report the capability. As such, by dynamically monitoring the real-time conditions related to communication quality, location of the UE, etc., and updating the UE capability with the Node B according to the real-time condition, the battery of the UE may be efficiently preserved.

In implementations, the UE may receive one or more network slices established through the components of the 5G network. The one or more network slices may correspond to one or more services requested by a user through the UE. As discussed herein, the network slice may also be referred to as a virtual end-to-end communication path dynamically created to provide the requested service to the UE. The network slice may include RAN component of the 5G network, e.g., gNB, and core network component, e.g., access and mobility function (AMF)/network repository function (NRF), etc. Multiple network slices may be operated on the UE at a time.

As discussed herein, the UE may report the capabilities to gNB upon receiving an enquiry from the gNB during and/or after the initial registration. In some examples, the UE may alter the capabilities per slice after the registration. The UE may report the altered capabilities on a certain network slice to the gNB preemptively without awaiting or request an enquiry, causing the gNB to use the altered capabilities on the certain network slice.

In some examples, when a battery charge of the UE meets a criterion, the UE may alter the capabilities on some network slices to reduce the battery consumption. For example, when the battery charge drops below a threshold, the UE may start to use lower capabilities on the URLLC slice to save battery. In some examples, the UE may use a lower capacity modulation, e.g., 16QAM, on the URLLC slice. In some other examples, the UE may use a lower power class, e.g., PC 1.5, on the URLLC slice. In yet other examples, the UE may disable some advanced antenna functions on the URLLC slice such as, multiple input multiple output (MIMO) in the uplink, antenna switching, etc. In yet other examples, the UE may disable carrier integration on the URLLC slice.

In some examples, the UE may also alter the capabilities on some network slices for load balancing purposes. The UE may use more advanced features of the capabilities on certain network slices while use less advanced features of the capabilities on other network slices.

In some examples, the UE may alter the capabilities on a preset time period of a day. For example, traffic congestion is normally seen during the rush hours of the day. Drivers and/or autonomous vehicles may want to receive the up-to-date traffic data on a map app installed on the UEs. The UEs may alter the capabilities on a vehicle to anything (V2X) slice during the rush hours such that real-time traffic data can be transmitted to the UEs. Alternatively, or additionally, a traffic control department may also need the up-to-date traffic data in an area during the rush hours. The vehicles and/or autonomous vehicles may also alter the capabilities on the V2X slice to ensure smooth data transmission of their locations, images, videos, etc. In some examples, the UE may enable advanced antenna features on the V2X slice such as MIMO in uplink, use higher power class (e.g., PC 1.5) or higher bandwidth (e.g., 100 MHz) on the V2X slice, etc.

In some examples, a network component of the 5G environment such as an AMF and/or a NRF may be configured to send a command to all the UEs operating on a certain network slice to alter the capabilities during the rush hours, and/or for other purposes.

The techniques discussed herein may be implemented in a computer network using one or more of protocols including but are not limited to Ethernet, 3G, 4G, 4G/LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario, in which methods for reporting UE capability are implemented, according to an example of the present disclosure.

The network scenario 100, as illustrated in FIG. 1, may be part of a telecommunication network of a wireless service provider such as, T-Mobile, AT&T, Sprint, Verizon Wireless, etc. The telecommunication network may include one or more core networks such as 4G evolved packet core (EPC) network, a 5G core network, etc. The network scenario 100 may include a packet data network (PDN) 122, one or more access points such as eNode B (eNB) 104 and gNode B (gNB) 106, and one or more network function entities that enable a user equipment (UE) such as UE 102(1) and UE 102(2), to connect to the PDN 122.

The one or more access points may be located in a radio access network (RAN) compatible with various radio access technologies (RATs), such as 5G NR, 4G/LTE, HSDPA/HSPA+, UMTS, CDMA, GSM, WiMAX, Wi-Fi, and/or any other previous or future generation of radio access technology. The eNB 104 may be compatible with 4G/LTE and the gNB 106 may be compatible with 5G NR. Although not shown, the network scenario 100 may also include other base stations, for example, 2G and 3G base stations that are compatible with GSM and CDMA RATs, respectively.

The PDN 122 may be a public data network established for providing data service for the public. Although not shown, the network scenario 100 may further include an IP multimedia system (IMS) that delivers voice (VoIP) and other multimedia services to the UEs over the PDN 122.

The one or more network functions/entities may be associated with the 4G EPC network and/or the 5G core network. Some functionalities presented in the 4G EPC network elements are evolved and mapped against the 5G core network functions. By way of examples and without limitation, the one or more network functions/entities, as shown in the network scenario 100 may include a mobility management entity (MME) 108, a serving gateway (SGW) 110, a PDN gateway (PGW) 116, a home subscriber server/unified data management function (HSS/UDM) 120, a policy and charging rules function/policy control function (PCRF/PCF) 118, a mobility management function (AMF) 114, etc.

The MME 108, as presented in the 4G EPC network, may be configured to provide mobility session management for the LTE network and support subscriber authentication, roaming and handovers to other networks. The functions of the MME 108 may be mapped against the AMF 114 in the 5G core network.

The SGW 110, as presented in the 4G EPC network, may be configured to route the data packets from the eNB 104 to the PGW 116 or vice versa. The SGW 110 may include a function SGW-U 110(1) in a user plane 124 and a function SGW-C 110(2) in a control plane 126. The PGW 116, as presented in the 4G EPC network, may be configured to act as an interface between the 4G EPC network and the PDN 122.

The PGW 116 is responsible for assigning IP addresses to UEs, filtering/inspecting packets, and supporting selected functionalities in the network. The PGW 116 may include a function PGW-U 116(1) in the user plane 124 and a function PGW-C 116(2) in the control plane 126.

The PGW-U 116(1) may serve as the user data plane ingress and egress point to the 4G EPC network when a separation between the user plane 124 and the control plane 126 is in place. When a subscriber establishes an evolved packet system (EPS) bearer to the PDN 122, the PGW-U 116(1) under the control of the PGW-C 116(2) may serve as the point of attachment to the PDN 122 for the life of the EPS bearer. The PGW-U 116(1) may perform packet inspection to ensure that the data is applied with an appropriate service level. The functions of the PGW-U 116(1) in the 4G EPC network may be mapped to a user plane function (UPF) in the 5G core network.

The PGW-C 116(2) may control the functionality performed by the PGW-U 116(1) when a separation between the user plane 124 and the control plane 126 is in place. When a subscriber establishes an EPS bearer to the PDN 122, the PGW-C 116(2) may select and control the point of attachment to the PDN 122 for the life of the EPS bearer. The PGW-C 116(2) may perform resource management for bearer resources, bearer binding, subscriber IP address management and mobility support. The functions of the PGW-C 116(2) in the 4G EPC network may be mapped to a session management function (SMF) in the 5G core network.

The HSS, as presented in the 4G EPC network, is a central database that contains all relevant details about subscriber information and user authentication. The HSS 120 also provides information for calls and IP session set up. In the 5G core network, the function of the HSS may be mapped against the UDM.

The PCRF, as presented in the 4G EPC network, may be configured to determine the policy rules in the IMS network, support service data flow detection, policy enforcement and flow-based charging. The functions of the PCRF may be mapped to the PCF in the 5G core network.

As discussed herein, frequency bands for the 5G NR may be separated into two different frequency ranges. Frequency Range 1 (FR1) includes frequency bands from 450 MHz to 6 GHZ, some of which overlaps the LTE frequency range. Frequency Range 2 (FR2) includes frequency bands from 24.25 GHz to 52.6 GHz.

In the 4G scenario, the UE 102(1) may connect to the EPC network through the eNB 104. The EPC network may provide a communication path between the UE 102(1) and the PDN 122. In the 5G scenario, the UE 102(2) may connect to the 5G core network through the gNB 106. The 5G core network may provide a communication path between the UE 102(2) and the PDN 122. A protocol data unit (PDU) session may be established to provide the end-to-end user plane activity between the UE 102(1) or the UE 102(2) and the PDN 122 through the PGW-U 116(1) or UPF.

It should be appreciated that the network scenario 100 is for the purpose of illustration. The 5G core network and/or the 4G EPC network may include one or more network functions in addition to those shown in FIG. 1. For example, the 5G core network may also include an authentication server function (AUSF), a network slice selection function (NSSF), a network repository function (NRF), a policy control function (PCF), a network exposure function (NEF), etc. The present disclosure is not intended to be limiting.

Figure 2:
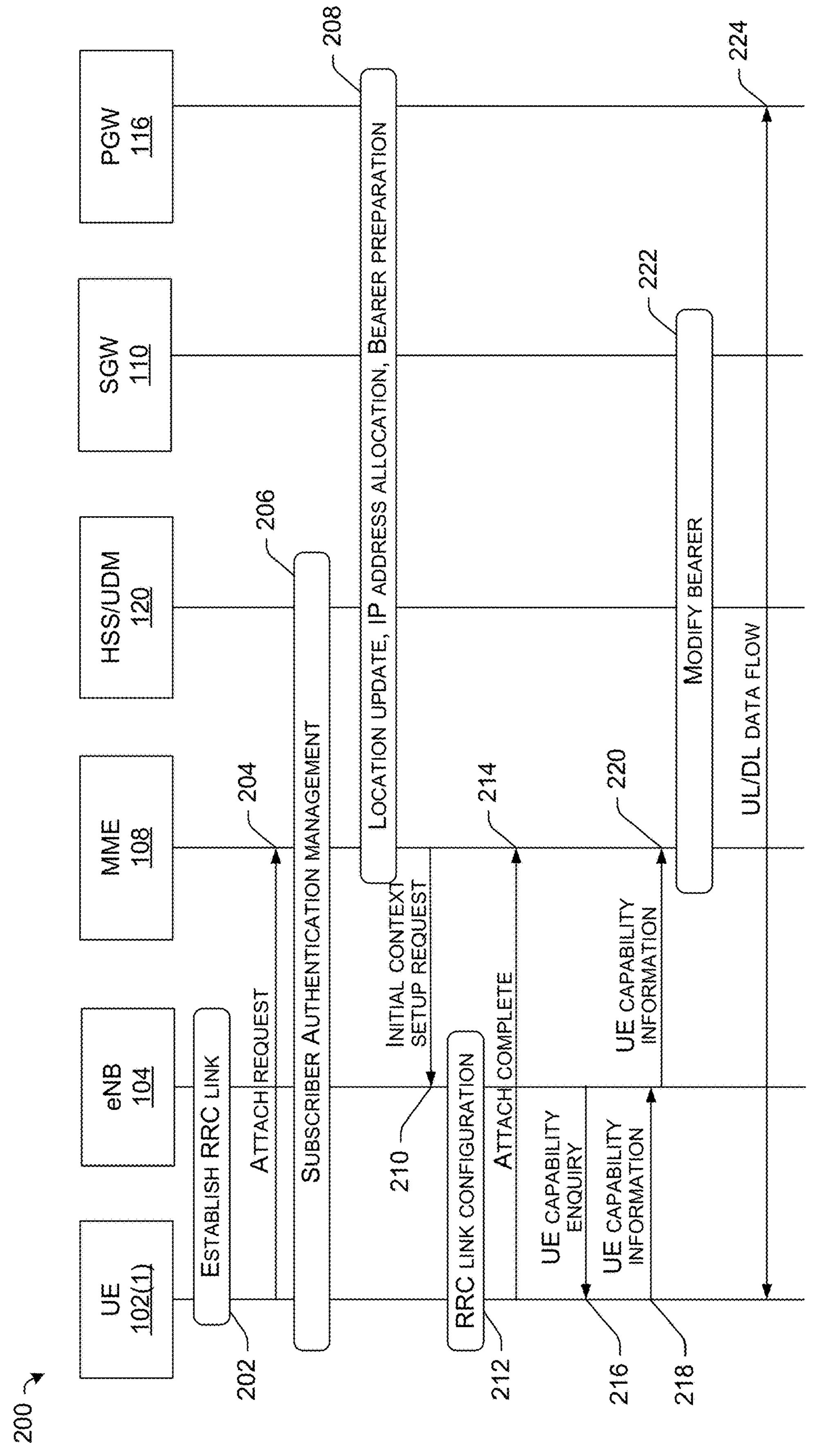
FIG. 2 illustrates an example process for reporting UE capability during UE registration, according to an example of the present disclosure.

FIG. 2 illustrates an example process for reporting UE capability during UE registration, according to an example of the present disclosure. The example process 200 may be part of an initial call setup process or a registration process in a 4G EPC network.

The example process 200 may begin with establishing a radio resource control (RRC) link at step 202. Upon powering on, the UE 102(1) may start searching for nearby cells. The UE 102(1) may acquire a frequency and timing synchronization with a searched cell. At step 204, the UE 102(1) may send an attach request to the MME 108 through eNB 104. In implementations, the attach request may be sent in a non-access stratum (NAS) message. The network capability of the UE 102(1) may be sent over the NAS message. By way of example and without limitation, the network capability of the UE 102(1) may include EPS encryption algorithm (EPA), EPS integrity algorithm (EIA), supported features such as CIoT, ProSe (D2D), DCNR, V2X etc.

At step 206, subscriber authentication management may be performed. In implementations, upon receiving the attach request from the UE 102(1), the MME 108 may query the HSS/UDM 120 for authentication information associated with the subscriber. The HSS/UDM 120 may return the authentication information to the MME 108. The MME 108 further requests the authentication information from the UE 102(1). If the authentication information provided by the UE 102(1) matches the authentication information provided by the HSS/UDM 120, the MME 108 may determine that the subscriber is authenticated.

At step 208, location update, IP address allocation, and bearer preparation may be performed. In implementations, the MME 108 may send an update location request to the HSS/UDM 120. As discussed herein, in the 4G EPC network, the subscriber information management function is performed by the HSS. The HSS/UDM 120 then records that the UE 102(1) is connected under the MME 108. The MME 108 may further send a create session request to SGW 110. Upon receiving the create session request, the SGW 110 sends a request for proxy binding update to the PGW 116. The PGW 116 may allocate an IP address to the UE 102(1) and notify the SGW 110 of the IP address allocation in a proxy binding acknowledgement message. As such, a core network communication path between the SGW 110 and the PGW 116 may be established for the allocated IP address. In implementations, the SGW 110 may further prepare a radio access bearer from itself to the eNB 104 and send a create session response signal to the MME 108. The MME 108 then configures the radio access bearer from the eNB 104 to the SGW 110 based on the information included in the create session response signal.

At step 210, the eNB 104 may receive an initial context setup request from the MME 108. At step 212, the eNB 104 may further perform RRC link configuration based on the initial context setup request and send the attach accept to the UE 102(1), thus completing the attach at step 214.

At step 216, the eNB 104 may send a UE capability enquiry to the UE 102(1). Upon receiving the UE capability enquiry, the UE 102(1) may send the UE capability information to the eNB 104 at step 218. The UE capability information may be further forwarded to the MME 108 at step 220. The MME 108 may send the UE capability information to the SGW 110, causing the SGW 110 to modify the configuration of the previously prepared radio access bearer from the SGW 110 to the eNB 104 at step 222.

In implementations, the UE capability information in response to the UE capability enquiry may indicate the radio capability of the UE 102(1) applicable to all supported carriers and carrier combinations. The UE capability information may also indicate the UE band capability and/or band combinations supported by the UE 102(1). In some examples, the UE capability information may also indicate specific UE capabilities such as Evolved Universal Terrestrial Radio Access (EUTRA) capability, NR capability, multi-RAT dual connectivity (MRDC) capability, etc. In implementations, the eNB 104 may query the UE capability in multiple enquiries. For example, the eNB 104 may send a first enquiry about EUTRA capability, and a second enquiry about NR capability, etc. The UE 102(1) may respond to each individual enquiry accordingly.

Through the above steps, a communication path between the UE 102(1) and the PGW 116 may be established, enabling the communication of the UE 102(1) with the PDN 122. Data packets and control signals may be transmitted in the downlink from the PGW 116 to the UE 102(1) and in the uplink from the UE 102(1) to the PGW 116 at step 224.

Figure 3:
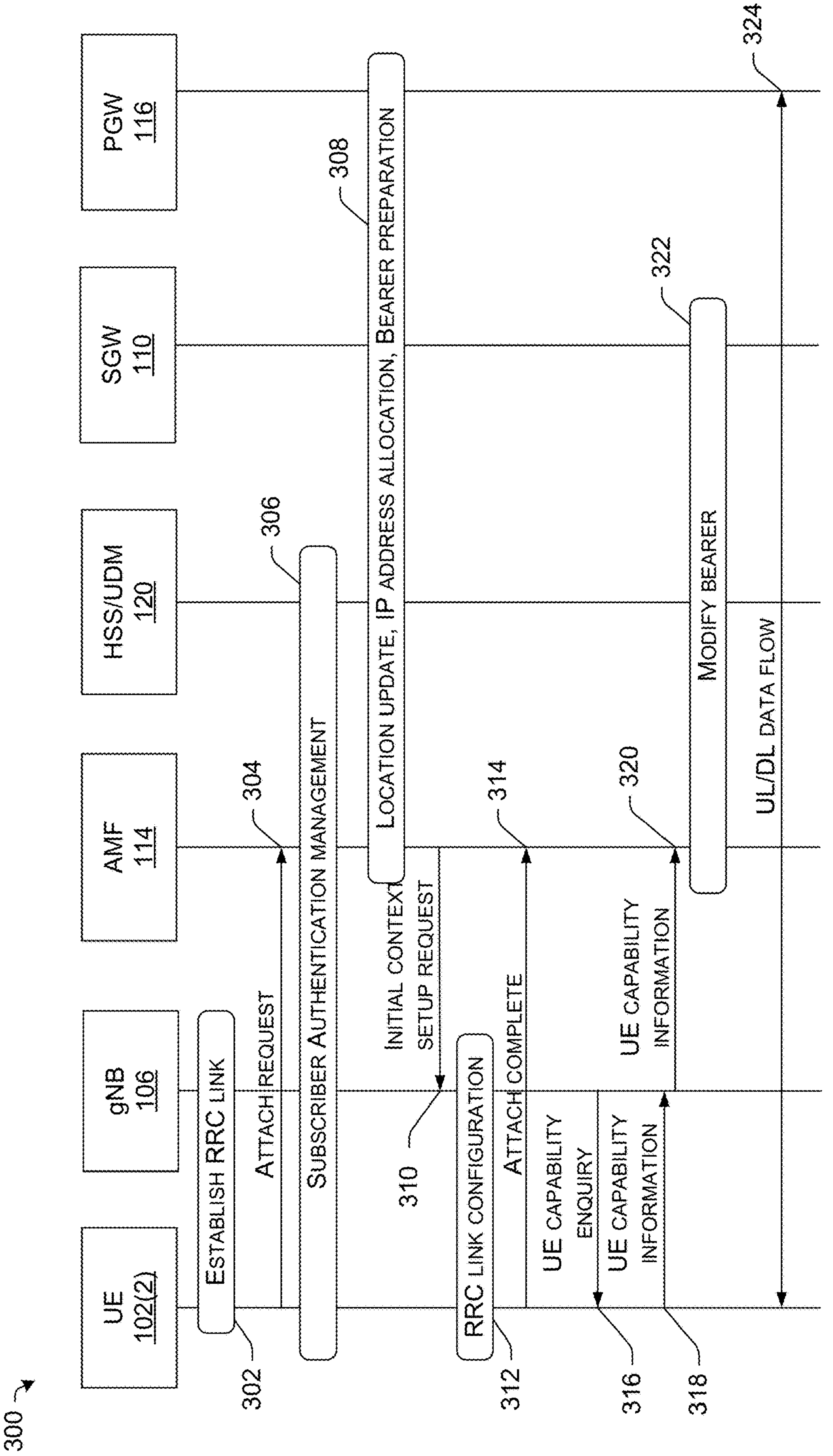
FIG. 3 illustrates an example process for reporting UE capability during UE registration, according to another example of the present disclosure.

FIG. 3 illustrates an example process for reporting UE capability during UE registration, according to another example of the present disclosure. The example process 300 may be part of an initial call setup process or a registration process in a 5G core network.

Similar to the example process 200, the example process 300 may begin with establishing an RRC link at step 302. At step 304, the UE 102(2) may send an attach request in a NAS message to the AMF 114 through the gNB 106. The network capability of the UE 102(2) such as EPS encryption algorithms, EPS integrity algorithms and supported features may be sent over the NAS message.

At step 306, subscriber authentication management may be performed, similar to step 206 of the example process 200. In implementations, upon receiving the attach request from the UE 102(2), the AMF 114 may query the HSS/UDM 120 for authentication information associated with the subscriber. As discussed herein, the subscriber information management function is performed by the UDM. The HSS/UDM 120 may return the authentication information to the AMF 114. The AMF 114 further requests the authentication information from the UE 102(2). If the authentication information provided by the UE 102(2) matches the authentication information provided by the HSS/UDM 120, the AMF 114 may determine that the subscriber is authenticated.

At step 308, location update, IP address allocation, and bearer preparation may be performed, similar to step 208 of the example process 200.

At step 310, the gNB 106 may receive an initial context setup request from the AMF 114. At step 312, the gNB 106 may further perform RRC link configuration based on the initial context setup request and send the attach accept to the UE 102(2), thus completing the attach at step 314.

At step 316, the gNB 106 may send a UE capability enquiry to the UE 102(2). Upon receiving the UE capability enquiry, the UE 102(2) may send the UE capability information to the gNB 106 at step 318. The UE capability information may be further forwarded to the AMF 114 at step 320. The AMF 114 may send the UE capability information to the SGW 110, causing the SGW 110 to modify the configuration of the previously prepared radio access bearer from the SGW 110 to the gNB 106 at step 322. The UE capability information may be similar to those described above in the example process 200.

Through the above steps, a communication path between the UE 102(2) and the PGW 116 may be established, enabling the communication of the UE 102(2) with the PDN 122. Data packets and control signals may be transmitted in the downlink from the PGW 116 to the UE 102(2) and in the uplink from the UE 102(2) to the PGW 116 at step 324.

It should be understood that the example process 200 and the example process 300 are for the purpose of illustration. The initial call setup process or the registration process of a UE in the 4G EPC network and/or the 5G core network may involve one or more steps, functions, and/or elements, in establishing the communication path between the UE and the PDN. Although the UE capabilities described herein are related to existing RATs. The present disclosure is not intended to be limiting. The UE capabilities may include the parameters associated with signal modulation schemes, antenna power class, bandwidth, antenna multiple input multiple output (MIMO) mode, etc. The UE capabilities may also include the parameters associated with any future radio access technologies.

Figure 4:
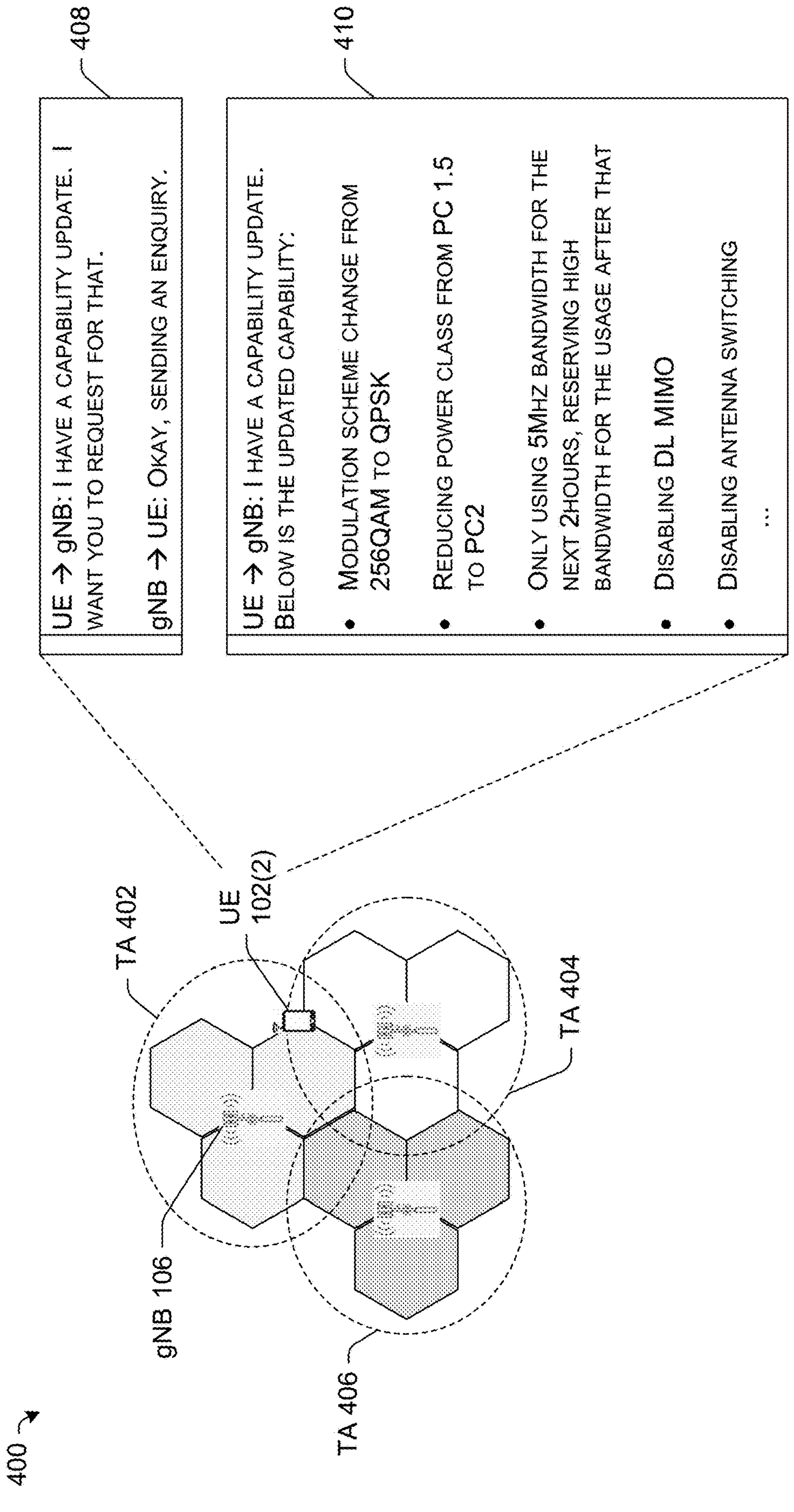
FIG. 4 illustrates an example scenario, in which reporting of updated UE capability is triggered after UE registration, according to an example of the present disclosure.

FIG. 4 illustrates an example scenario, in which reporting of updated UE capability is triggered after UE registration, according to an example of the present disclosure.

As illustrated in the example scenario 400, multiple gNBs may cover a plurality of tracking areas (TAs), e.g., TA 402, TA 404, and TA 406. For example, gNB 106 may cover TA 402, which is comprised of a plurality of cells. After the initial registration, the location of the UE 102(2) appears to be near an edge of a cell from the gNB 106. At the edge of the cell, the UE 102(2) may experience high signal interference, setup failures, high packet loss rate, call drops, low throughput, etc. The UE 102(2) may attempt to reconnect to the network and/or resend the data, causing a fast drain of the battery. In such circumstances, the UE 102(2) may determine to adjust one or more capability parameters to save battery.

In existing techniques, the UE may report the capability information to the gNB when requested by the gNB. If gNB does not request to update the UE capability, the UE does not report the capability. To address the issues at the edge of the cell, in some examples, the UE 102(2) may send a message to the gNB 106, requesting the gNB 106 to send a UE capability enquiry. As shown in an example conversation block 408, the UE 102(2) generates a message of "I have a capability update. I want you to request for that" and sends the message to gNB 106. Upon receiving the message, the gNB 106 responds with a message of "Okay, sending an enquiry."

In another example, the UE 102(2) may voluntarily send the updated capability to the gNB 106 without requesting to receive the enquiry. As shown in another example conversation block 410, the UE 102(2) may generate a message of "I have a capability update. Below is the updated capability information." The UE 102(2) may send the message together with the details of the updated capability to the gNB 106. Upon receiving the message containing the detailed information of the update, the gNB 106 may adjust the configuration for the UE 102(2) promptly. By allowing the UE 102(2) to report an update on the capability with no need to await an enquiry from the gNB 106, the UE 102(2) may respond quickly to the communication deterioration situation when roaming to the edge of a cell.

In some examples, the proactive reporting of the UE capability may be triggered when a packet loss rate is observed to be equal to or greater than a preset threshold, for example, 3%. In another example, the proactive reporting of the UE capability may be triggered when a block error rate (BLER) is observed to equal to or greater than a preset threshold. For example, for an in-sync condition, the BLER preset threshold may be 2% and for an out-of-sync condition the BLER preset threshold may be 10%.

It should be understood that the reporting of the UE capability at the edge of a cell triggered by quality deterioration described herein is for the purpose of illustration. The proactive reporting of the UE capability may be triggered by other conditions. For example, a detected RAT type change may trigger a capability update reporting. In another example, a change of the tracking area may trigger a capability update reporting. In yet another example, a change of a terrain condition (e.g., from low elevation to high elevation) may trigger a capability update reporting. In yet another example, a change of a temperature may also trigger a capability update reporting.

It should also be understood that the conversation shown in FIG. 4 is merely for purposes of conveying the concepts and flow. The conversation as shown in blocks 408 and 410 may not represent an actual conversation between the UE and the gNB in the telecommunication network.

In some examples, the UE capability update may include a change of the signal modulation scheme. For example, when the packet loss rate and/or the BLER is observed to get higher, the UE 102(2) may request an update of the modulation scheme from 256 Quadrature Amplitude Modulation (QAM) to Quadrature phase-shift keying (QPSK), or from 256QAM to 64QAM or 16QAM. In another example, the UE capability update may include a change of the power class (PC). For example, when experiencing call drops and low throughput, the UE 102(2) may want to lower the maximum transmit power to save battery. The UE 102(2) may request an update from a higher power class (e.g., PC 1.5) to a lower power class (e.g. PC 2). In yet another example, the UE capability update may include a change of the antenna configurations such as, disabling a Sounding Reference Signal (SRS) antenna switching. In yet another example, the change of the antenna configurations may include a change in the downlink MIMO configuration, a change in the beamforming settings, etc. In yet another example, the UE 102(2) may request gNB 106 to use a low bandwidth (e.g., 5 MHz) to save battery and reserve the high bandwidth for future use.

In some example, the UE 102(2) may compile one or more capabilities for updating and send the information associated with the updating to the gNB 106. In another example, when sending the capability update information, the UE 102(2) may also indicate a time period that the capability update will take effect. The UE 102(2) may indicate to the gNB 106 that the capability will be reversed after the time period. Alternatively or additionally, the UE 102(2) may indicate to the gNB 106 that an enquiry for UE capability is desired after the time period.

It should be understood that the update of the UE capability may be from a higher capability to a lower capability or vice versa. In some examples, when compiling one or more capabilities, some capability may be changed from a higher capability to a lower capability while another capability may be changed from a lower capability to a higher capability, depending on the real-time conditions of the UE. The present disclosure is not intended to be limiting.

Figure 5:
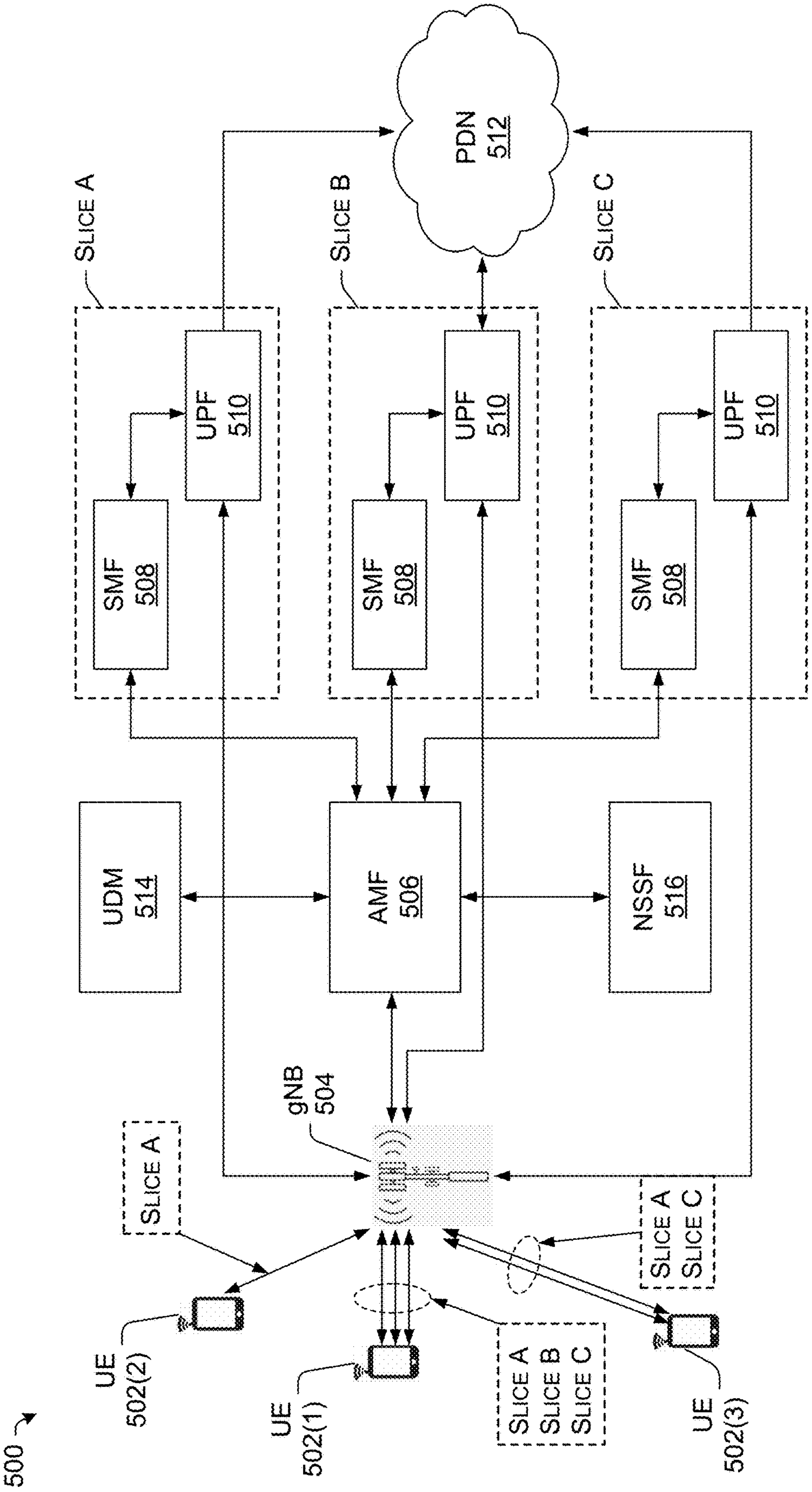
FIG. 5 illustrates an example network scenario, in which methods for altering UE capability on network slices are implemented, according to an example of the present disclosure.

FIG. 5 illustrates an example network scenario, in which methods for altering UE capability on network slices are implemented, according to an example of the present disclosure.

The network scenario 500, as illustrated in FIG. 5, may be part of a 5G network environment. The network scenario 500 may include one or more access networks comprised of base stations and node Bs such as gNB 504 and one or more network function entities that enable a user equipment (UE) such as UE 502(1), UE 502(2), and UE 502(3) (hereafter referred to as UE 502) to access a packet data network (PDN) 512.

The UE 502 may be configured with similar capabilities as those described with respect to the UE 102 of FIG. 1. The PDN 512, similar to the PDN 122 of FIG. 1, may comprise one or more public data networks established for providing data services. The one or more network function entities associated with the 5G network environment may include but not limited to an access and mobility management function (AMF) 506, a session management function (SMF) 508, a user plane function (UPF) 510, a unified data management function (UDM) 514, a network slicing selection function (NSSF) 516, etc.

The AMF 506 is a control plane function of the 5G network environment. The AMF 506 may be configured to handle connection and mobility management tasks, similar to the AMF 114 of FIG. 1. In some implementations, a gNB (e.g., gNB 504) may select an AMF (e.g., AMF 506) that supports the network slice requested by the UE (e.g., UE 502). The AMF 506 may also acquire information of the network slice subscribed by the UE 502 from the UDM 514. In some examples, when an initial AMF does not support the network slice requested by the UE, the NSSF 516 may select a target AMF that supports the network slice.

The SMF 508 performs a fundamental role in the 5G Service-Based Architecture (SBA). The SMF 508 may be configured to interact with the decoupled data plane, creating, updating and removing Protocol Data Unit (PDU) sessions and managing session context with the UPF 510.

The SMF 508 may be configured to perform operations similar to those described with respect to the PGW-C/SMF 116(2), as illustrated in FIG. 1.

The UPF 510 may be configured to interconnect the PDN 512 with the 5G network architecture. The UPF 510 may be responsible for data packet routing and forwarding, data packet inspections, QoS (Quality of Service) handling, etc. The UPF 510 may enable the edge function of the 5G environment and act as an anchor point for intra & inter RAT mobility. The UPF 510 may be configured to perform operations similar to those described with respect to the PGW-U/UPF 116(1), as illustrated in FIG. 1.

The UDM 514, as a control plane function, may be configured to manage data for access authorization, user registration, and data network profiles. The UDM 514 may be configured to perform operations similar to the HSS/UDM 120, as illustrated in FIG. 1.

The NSSF 516 may be configured to select an optimal network slice available for the service requested by the user in the 5G network environment. The NSSF 516 may select a network slicing instance (NSI), determine the allowed network slice selection assistance information (NSSAI), and set an AMF to serve the UE.

In some examples, one or more network slices may be created for a single UE. As illustrated in FIG. 1, slice A, slice B, and slice C are created for the UE 502(1), slice A is created for 502(2), and slice A and slice C are created for the UE 502(3). The UE 502(1), 502(2), and 502(3) are all connected to gNB 504. The virtual end-to-end communication paths are established for slice A, slice B, and slice C, respectively, through the gNB 504, the AMF 506, the SMF 508, and the UPF 510. Currently, a UE may support up to eight network slices at a time. Based on the requirements of bandwidth, latency, and/or reliability of currently identified slices/services, the network slices may include several categories such as Enhanced Mobile Broadband (eMBB), Ultra-reliable low latency communications (URLLC), Massive Internet of Things (MIT), Vehicle to Vehicle communications (V2V), Vehicle to Instructure communications (V21), Vehicle to Anything (V2X), High Performance Machine Type Communications (HMTC), Massive Machine Type Communications (MMTC), etc.

Figure 6:
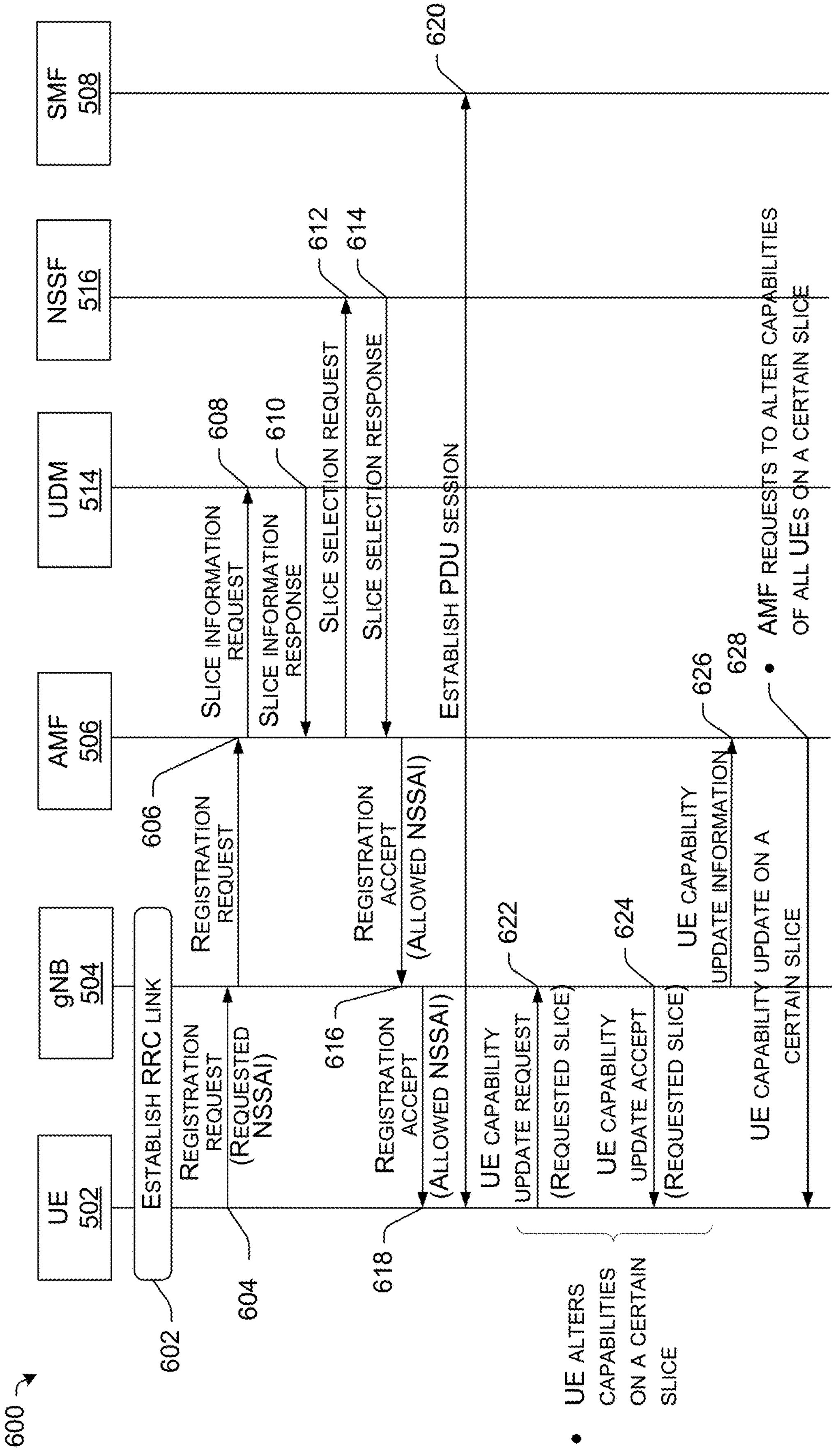
FIG. 6 illustrates an example process for altering UE capability on network slices, according to an example of the present disclosure.

FIG. 6 illustrates an example process for altering UE capability on network slices, according to an example of the present disclosure. The example process 600 may include an initial call setup process or a registration process and subsequent message exchanges between the UE and the network components in a 5G core network.

At step 602, a radio resource control (RRC) link may be established. At step 604, the UE 502 may send a registration request to the gNB 504, which is further forwarded to the AMF 506 at step 606. The registration request may indicate a requested NSSAI associated with a service requested by a subscriber. The NSSAI may contain a slice/service type (SST) field and an optional slice differentiator (SD). The SD is an optional field used to differentiate multiple slices in the same slice/service type. For instance, the value of SST being “1” indicates that the slice/service requested is eMBB, the value of SST being “2” indicates that the slice/service requested is URLLC, the value of SST being “3” indicates that the slice/service requested is MIoT, the value of SST being “4” indicates that the slice/service requested is V2X, and the value of SST being “5” indicates that the slice/service requested is HMTC.

In some examples, the UE 502 may generate multiple NSSAI requests. The UE 502 may generate the NSSAI request from allowed NSSAI that the UE 502 has been provide with and/or allowed NSSAI for a current serving public land mobile network (PLMN). Alternatively, or additionally, The UE 502 may also generate the S-NSSAI request from the configured NSSAI.

At step 608, the AMF 506 may send a slice information request to the UDM 514. The UDM 514 may check if the requested slice is allowed for the UE 502. If the requested slice is allowed for the specific UE, at step 610, the UDM 514 may send a slice information response to indicate an acceptance of the request. If the requested slice is not allowed for the specific UE, the UDM 514 may send the slice information response to indicate a rejection of the request.

Once the slice request is accepted, at step 612, the AMF 506 may send a slice selection request to NSSF 516. Based on the capabilities of the AMF, the NSSF 516 may determine whether the AMF 506 can handle the registration process or it should re-route the registration request to another AMF (target AMF) for further action. If it is determined that the AMF 506 can handle the registration process, the NSSF 516 may send a slice selection response to the AMF 506. At steps 616 and 618, the AMF 506 may then prepare the allowed and/or configured NSAAI and delivers the allowed and/or configured NSAAI to the UE 504 via a registration accept message. If it is determined that the AMF 506 cannot handle the registration process, the NSSF 516 may re-route the registration request to a target AMF to complete the registration.

In some examples, the registration may further include one or more steps related to subscriber authentication and security management performed by an authentication server function (AUSF), not shown in FIG. 6.

At step 620, a PDU session for the requested slice may be established between the UE 502 and a packet data network (e.g., the PDN 512) through the gNB 504, the AMF 506, and the SMF 508.

Similar to the scenario shown in FIG. 3, the UE 502 may send the information of the UE capabilities to the gNB 504 when the UE first attaches to the network. In some examples, for certain slices, the UE 502 may report to the gNB 504 to use all of the advanced features such as UL MIMO, PC 1.5, 4CC carrier aggregation, higher bandwidths (e.g., 100 MHz vs. 40 MHZ), etc., while for some other slices, the UE 502 may report to the gNB 504 to use lower modulation schemes (e.g., 16QAM vs. 1024QAM), PC 3, etc.

In some examples, after the initial registration, the UE 502 may determine to change the capabilities for a certain slice. For instance, when a battery charge drops to or below a threshold when operating on an URLLC slice, the UE 502 may determine to reduce the capabilities and send a UE capability update request to gNB 504 preemptively. At step 622, the UE 502 may send a UE capability update request to the gNB 504. The UE capability update request may indicate that the change is to be applied to a specific slice. In response, at step 624, the gNB 504 may send a UE capability update accept to the UE 502. The UE capability update accept may indicate that the gNB 504 agrees to update the UE capability for the specific slice. At step 626, the gNB 504 may forward the UE capability update information for the specific slice to the AMF 506.

In some examples, the AMF 506 and/or a network repository function (NRF) may send a request to update the UE capability on a certain slice to the UE 502 at step 628. In some examples, the AMF 506 and/or the NRF may be configured to send a command to all UEs on a specific slice to alter their capabilities during a preset time period of the day. For instance, the AMF 506 and/or the NRF may send the command to all UEs operating on a V2X slice to alter the capabilities during the rush hours of the weekdays. Alternatively, or additionally, the UE 502 may preset the rush hour condition in the device and generate the request to alter the capability when the condition is triggered.

It should be understood that the trigger condition to alter the capabilities on certain network slices discussed herein is for illustrative purpose. The present disclosure is not intended to be limiting. In some examples, the UE may alter the UE capabilities to achieve load-balancing.

Figure 7:
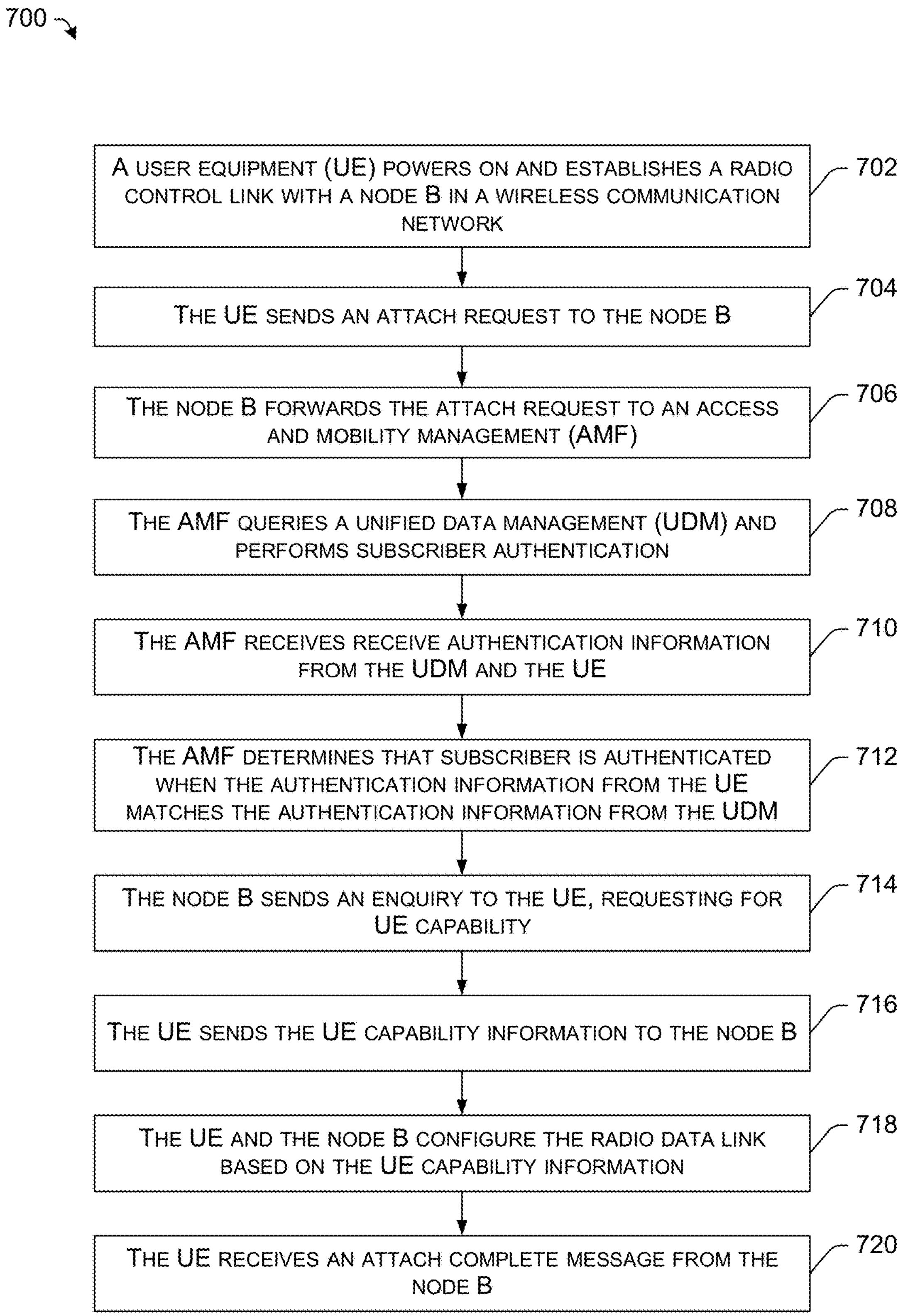
FIG. 7 illustrates an example flowchart for reporting UE capability, according to an example of the present disclosure.

FIG. 7 illustrates an example flowchart for reporting UE capability, according to an example of the present disclosure. The example flowchart 700 may correspond to the example process 300, as illustrated in FIG. 3, in which, an initial call setup and/or registration of the UE is performed in the 5G core network.

At operation 702, a UE may power on and establish a radio control link with a Node B in a wireless communication network. As discussed herein, the Node B may be an eNode B in a 4G EPC network (e.g., eNB 104 in FIG. 1) or a gNode B in a 5G core network (e.g., gNB 106 in FIG. 1).

At operation 704, the UE may send an attach request to the Node B. In some examples, the attach request may be sent in a NAS message encrypted using an encryption algorithm. The network capability of the UE may also be sent over the NAS message such EPA, EIA, supported features such as CloT, ProSe (D2D), DCNR, V2X etc.

At operation 706, the Node B may forward the attach request to an access and mobility management function (AMF). As discussed herein, in the 5G core network, a gNode B may forward the attach request to the AMF. In the 4G EPC network, an eNode B may forward the attach request to a mobility management entity (MME).

At operation 708, the AMF may query a unified data management (UDM) and perform subscriber authentication. In the 4G EPC network, the MME may query a home subscriber server (HSS) for the subscriber information.

At operation 710, the AMF may receive authentication information from the UDM and the UE. In some examples, the authentication information from the UDM and the UE may be represented in vectors.

At operation 712, the AMF may determine that subscriber is authenticated when the authentication information from the UE matches the authentication information from the UDM. In implementations, the AMF may determine whether the authentication vectors from the UE match with the authentication vectors from the UDM.

At operation 714, the Node B may send an enquiry to the UE, requesting for UE capability. In some examples, the Node B may send multiple enquiries to the UE, requesting for different UE capability.

At operation 716, the Node B may send the UE capability information to the Node B. As discussed herein, the Node B may send the UE capability information according to the enquiry. For example, if the Node B requests for NR capability, the UE may respond to indicate whether it supports the NR.

At operation 718, the UE and the Node B may configure a radio data link based on the UE capability information. After knowing the UE capability, the Node B may determine correct scheduling for the UE. If the UE supports a certain feature or function, the Node B may configure the UE for the feature or function. If the UE does not support a certain feature, the Node B will not configure the function for the UE.

At operation 720, the UE may receive an attach complete message from the Node B. In some examples, the AMF may further communicate with a serving gateway (SGW) to acquire an IP address of the UE allocated by a PDN gateway (PGW). A communication path from the UE to a packet data network (PDN) may be established after the attach completes.

Although the functions/elements of a 5G core network and the functions/elements of a 4G EPC network are separately used for illustration, in a 4G/5G converged core network, the corresponding functions/elements may be implemented in a single entity. For example, the functions of MME and AMF may be implemented in one entity, the functions of HSS and UDM may be implemented in one entity, the functions of PGW in control plane and SMF may be implemented in one entity, the functions of PGW in user plane and the UPF may be implemented in one entity, the functions of PCRF and PCF may be implemented in one entity, etc.

Figure 8:
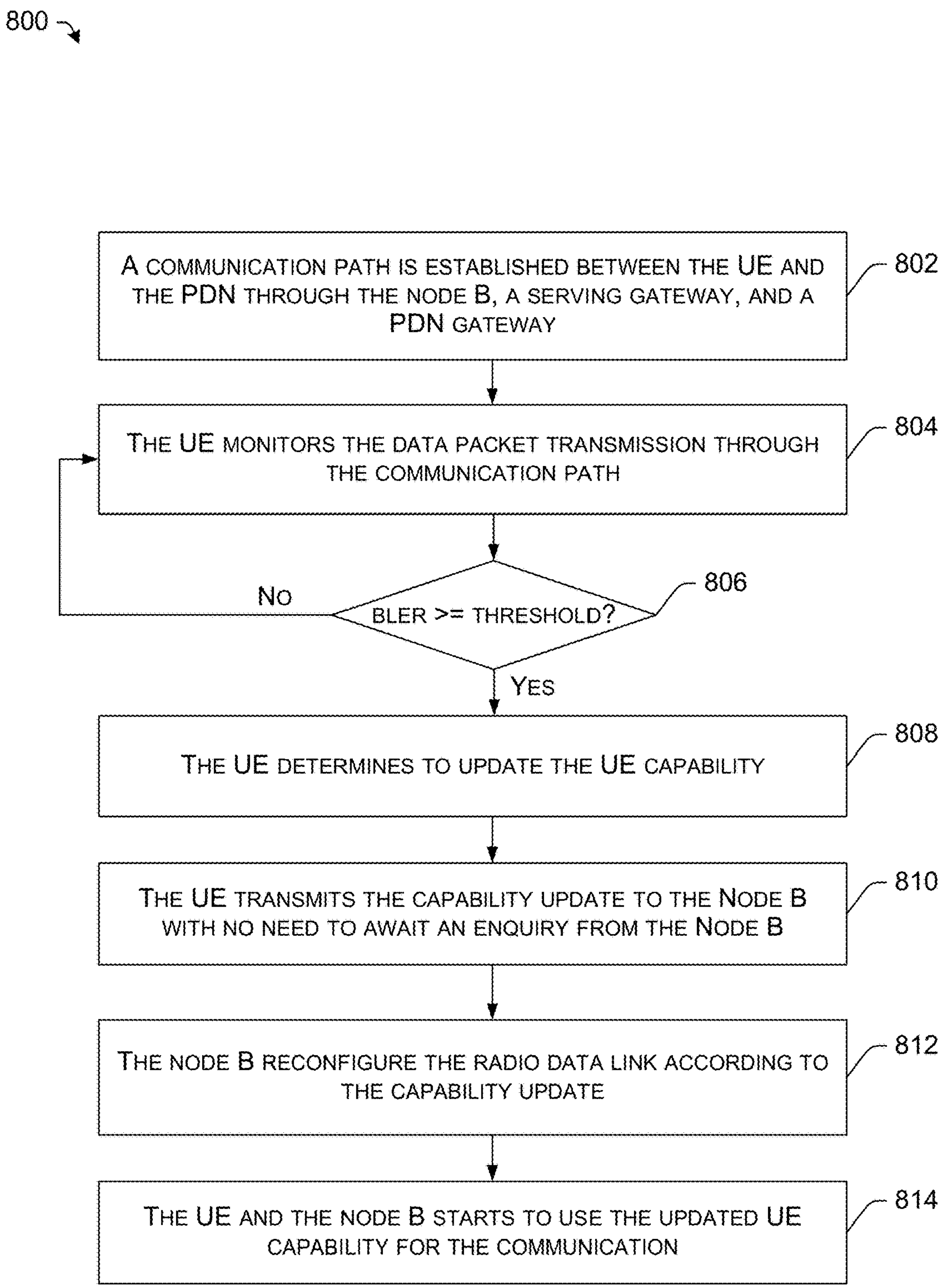
FIG. 8 illustrates an example flowchart for reporting UE capability, according to another example of the present disclosure.

FIG. 8 illustrates an example flowchart for reporting UE capability, according to another example of the present disclosure. The example flowchart 800 may correspond to reporting UE capability when triggered by a high block error rate (BLER).

At operation 802, a communication path may be established between the UE and the PDN through the Node B, a serving gateway (SGW) and a PDN gateway (PGW). The details of establishing the communication path may be described with respect to the example flowchart 700 shown in FIG. 7.

At operation 804, the UE may monitor the data packet transmission through the communication path. In some instances, the UE may monitor the data packets transmitted at the uplink to the PDN and received at the downlink channel from the PDN.

At operation 806, the UE may determine whether the BLER is equal to or greater than a threshold. As discussed herein, the BLER defines a ratio of the number of transport blocks received in error to the total number of blocks transmitted over a certain number of frames. The BLER may measure the physical layer performance of the UE and may be performed after channel de-interleaving and decoding by evaluating the cyclic redundancy check (CRC) on each received transport block. In general, for a given modulation depth, the cleaner the radio channel or the higher the signal to noise ratio (SNR), the less likely the transport block being received in error. Alternatively, for a given SNR, the higher the modulation depth, the higher the possibility of error due to interference, thereby magnifying the BLER.

If the BLER is less than the threshold, the process returns to operation 804.

If the BLER is equal to or greater than the threshold, the UE may determine to update the UE capability at operation 808. In implementations, the UE may choose a modulation scheme with lower depth to address the high BLER issue. For example, the UE may choose to update the modulation scheme from 256 QAM to QPSK.

At operation 810, the UE may transmit the capability update to the Node B with no need to await an enquiry from the Node B. As discussed herein, the UE does not wait for an enquiry from the Node B or request the Node B to send an enquiry in order to send over the updated capability. Rather, once the trigger condition is satisfied, e.g., the BLER reaches the threshold, the UE may voluntarily send the capability update to the Node B.

At operation 812, the Node B may reconfigure the radio data link according to the capability update. Upon receiving the capability update, the Node B may reconfigure the radio data link according to the capability that the UE indicates to update.

At operation 814, the Node B and the UE may start to use the updated capability for the communication. As discussed herein, the Node B may configure the UE with the capability that the UE supports and/or desires.

It should be understood that the trigger condition described herein is for the purpose of illustration. Other than the BLER, a packet loss rate in the downlink channel may also be used as a trigger condition for voluntary reporting of the UE capability.

Figure 9:
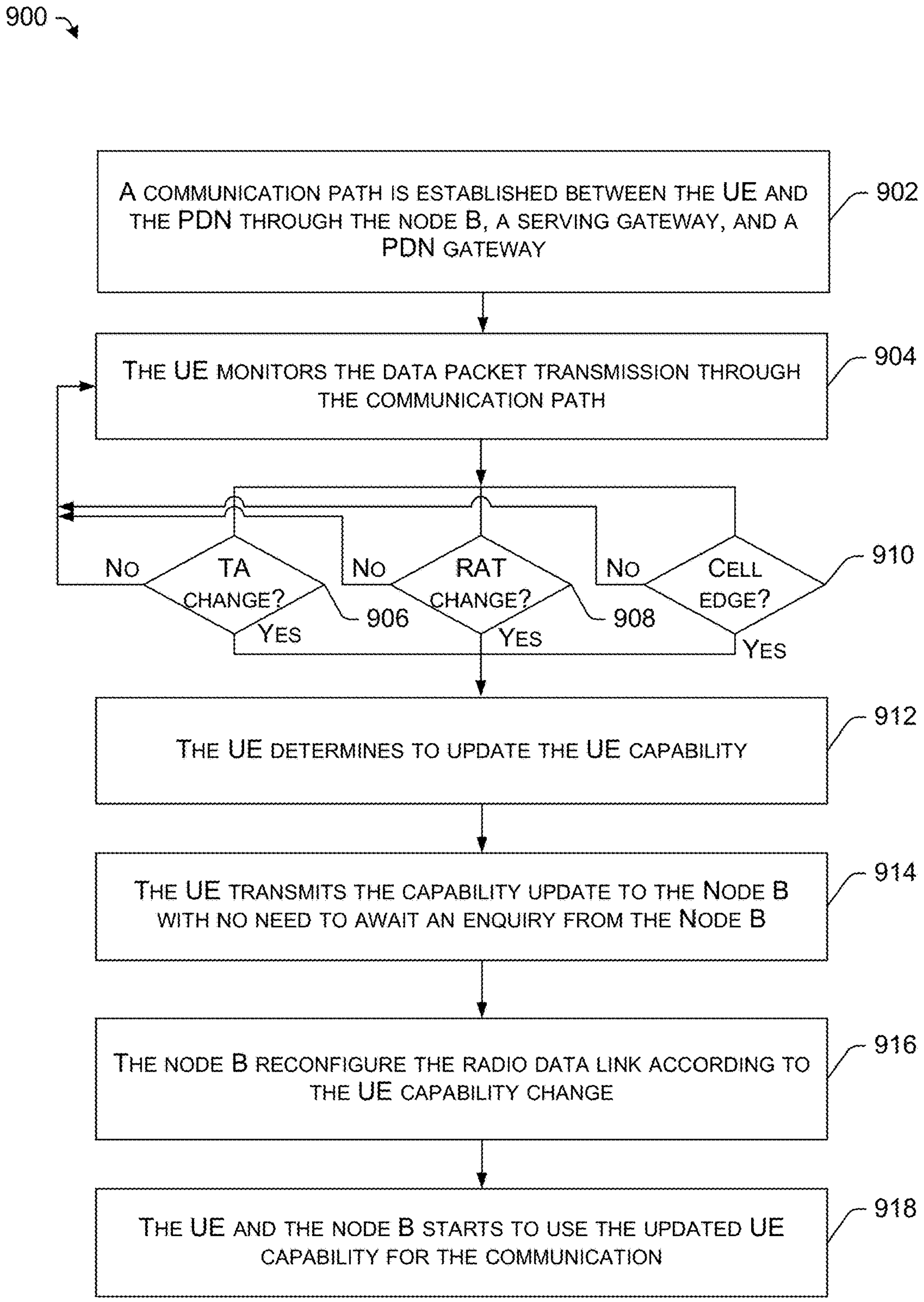
FIG. 9 illustrates an example flowchart for reporting UE capability, according to another example of the present disclosure.

FIG. 9 illustrates an example flowchart for reporting UE capability, according to another example of the present disclosure. The example flowchart 900 may correspond to reporting UE capability when triggered by a tracking area change, a RAT type change, and/or a cell edge condition.

At operation 902, a communication path may be established between the UE and the PDN through the Node B, a serving gateway (SGW) and a PDN gateway (PGW). The details of establishing the communication path may be described with respect to the example flowchart 700 shown in FIG. 7.

At operation 904, the UE may monitor the data packet transmission through the communication path. In some examples, the UE may monitor the data packets and the signaling data transmitted to/from the Node B.

At operation 906, the UE may determine whether there is a tracking area change. In implementations, a tracking area code (TAC) may be used to locally identify a tracking area (TA). When the UE moves to a new TA, which is not included in its list of TAs with which the UE is registered, the UE may initiate a TA update procedure by sending a TA update request to the Node B. If there is no tracking area change, the process returns to operation 904. If there is a tracking area change, the process may go to operation 912.

Alternatively or additionally, at operation 908, the UE may determine whether there is an RAT change. As discussed herein, when the UE moves around to an area where 5G NR is not available, the UE may switch to LTE. In another example, when the 5G NR and 4G LTE both are not available, if there is a Wi-Fi nearby, the UE may switch to Wi-Fi connection. If there is no RAT change, the process returns to operation 904. If there is an RAT change, the process may go to operation 912.

Alternatively or additionally, at operation 910, the UE may determine whether the UE is at a cell edge. In implementations, when frequent call dropping and low data throughput are observed, the UE may determine that the UE moves to an edge of the cell. If the UE is not determined at the cell edge, the process returns to operation 904. If the UE is determined at the cell edge, the process may go to operation 912.

At operation 912, the UE may determine to update the UE capability. In implementations, the UE may determine to use a different modulation scheme. In another implementation, the UE may determine to adjust the power class of the antenna. In yet another implementation, the UE may determine to disable the antenna switching function. In yet another implementation, the UE may determine to adjust the downlink MIMO settings and/or beamforming settings. In yet another implementation, the UE may determine to use low bandwidth for a time period and reserve the high bandwidth after the time period. In some examples, the UE may compile one or more capabilities that need to be updated based on the conditions. In addition, the UE may set a time period, for which, the capability update will be enforced. The UE may indicate to the Node B that the capability will resume after the time period. Alternatively, the UE may indicate to the Node B to send an enquiry for the capability after the time period.

At operation 914, the UE may transmit the capability update to the Node B with no need to await an enquiry from the Node B. Similar to the scenario illustrated in FIG. 8, the UE does not wait for an enquiry or request the Node B to send an enquiry in order to send over the updated capability. Once the trigger condition is satisfied (e.g., the TA or RAT changes, the UE is located near the edge of a cell), the UE may send the capability update to the Node B.

At operation 916, the Node B may reconfigure the radio data link according to the capability update. Upon receiving the capability update, the Node B may reconfigure the radio data link according to the capability that the UE indicates to update.

At operation 918, the Node B and the UE may start to use the updated capability for the communication. As discussed herein, the Node B may configure the UE with the capability that the UE supports and/or desires.

It should be understood that the trigger condition described herein (e.g., TA change, RAT change, cell edge) is for the purpose of illustration. Any real-time conditions that cause one or more of low data throughput, high packet loss rate, call setup failure, call dropping, etc., which are likely to drain the battery fast due to excessive retransmission/reconnection attempts, may trigger a voluntary reporting of the capability update to the Node B.

Figure 10:
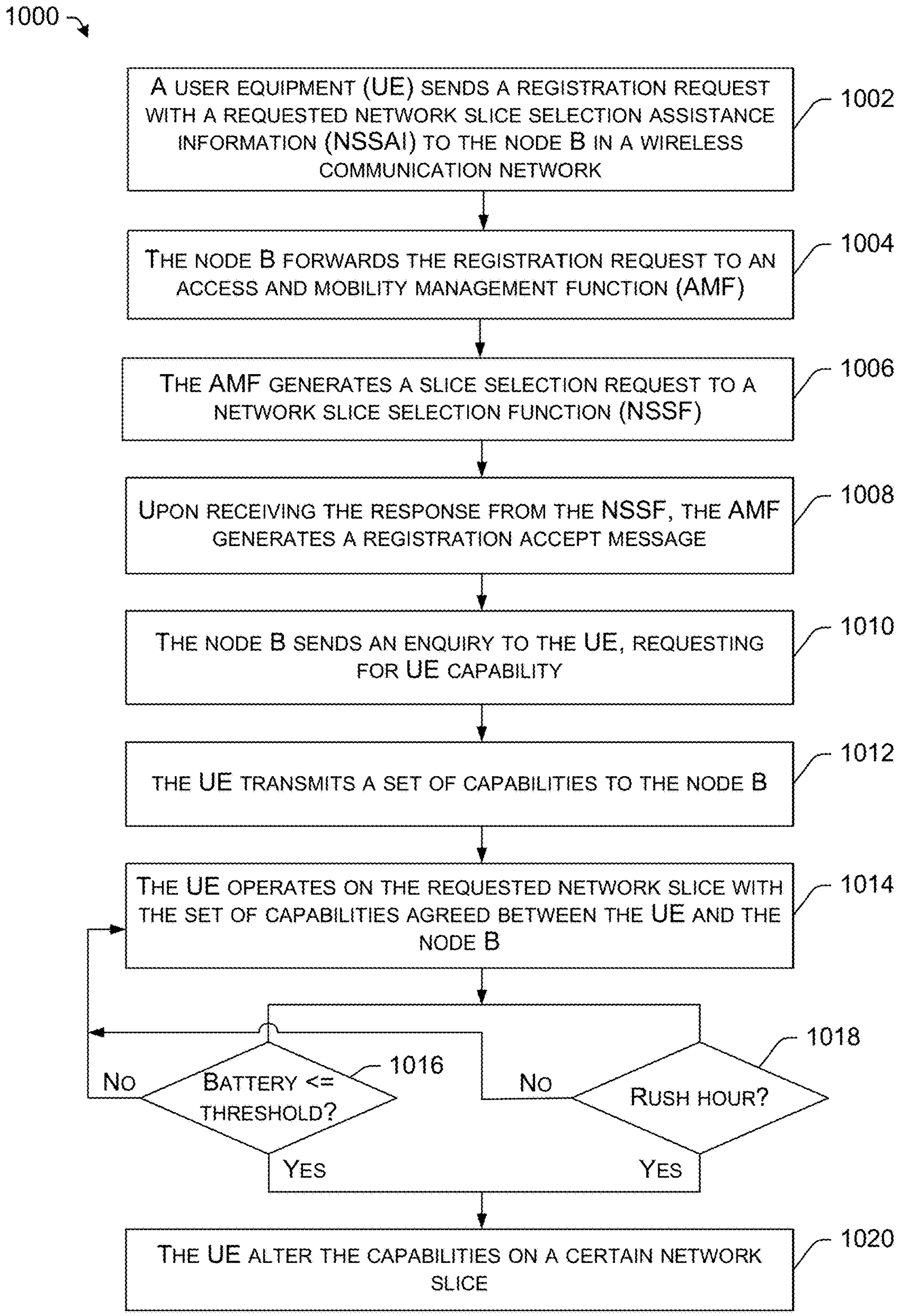
FIG. 10 illustrates an example flowchart for altering UE capability, according to an example of the present disclosure.

FIG. 10 illustrates an example flowchart for altering UE capability, according to an example of the present disclosure. The example flowchart 1000 may correspond to the example process 600, as illustrated in FIG. 6, in which, UE requests to alter the capability in certain network slices.

At operation 1002, a UE may send a registration request with a requested network slice selection assistance information (NSSAI) to the node B in a wireless communication network. As discussed herein, the registration request may be an initial request from the UE to attach to the 5G core network. In some examples, the registration request may be a re-registration of the UE due to a connection loss. The UE may generate the NSSAI from the allowed NSSAI (e.g., the NSSAI already provided to the UE). Alternatively, or additionally, the UE may generate the S-NSSAI from the configured NSSAI. In implementations, the UE may request multiple NSSAI in a combination of the allowed NSSAI and the configured NSSAI. In some examples, the registration request may also include a description of the requested slice/service in terms of throughput, latency, security level, etc.

At operation 1004, the node B may forward the registration request to an access and mobility management function (AMF). As discussed herein, the AMF may perform subscriber authentication associated with the registration request by comparing the authentication information from a unified data management (UDM) with the authentication information from the UE. When the authentication information from the UDM and the UE matches each other, the AMF may determine the subscriber is authenticated.

At operation 1006, the AMF may send a slice selection request to a network slice selection function (NSSF). The NSSF may determine whether the UE is authorized to perform the requested slice/service. If the UE is authorized to perform the requested slice/service, the NSSF may assign the requested slice to the UE in a response. As discussed herein, the NSSF may correspond to the NSSF 516 shown in FIG. 5.

At operation 1008, upon receiving the response from the NSSF, the AMF may generate a registration accept message. The registration accept message may be further forwarded to the UE through a node B (e.g., gNB 504 as shown in FIG. 5).

At operation 1010, the node B may send an enquiry to the UE, requesting for UE capability. Upon receiving the enquiry, at operation 1012, the UE may transmit a set of capabilities to the node B. As discussed herein, once agreed by the node B, the UE may use the set of capabilities until receiving another enquiry for capability from the node B. Alternatively, the UE use the set of capabilities until a condition is triggered to change the capabilities.

At operation 1014, the UE may operate on the requested network slice with the set of capabilities agreed between the UE and the node B. As discussed herein, multiple slices/services may be offered on the UE. The UE may use the same set of capabilities while operating on the multiple slices.

At operation 1016, the UE may determine whether the battery charge drops to or below a threshold. When the battery is above the threshold, the operation returns to 1014. When the battery meets or drops below the threshold, at operation 1020, the UE may alter the capabilities on a certain network slice and report the capabilities to the node B. As an example, the threshold may be set as 10% of the battery. The UE may further configure the threshold dynamically based on service needs. In some examples, to save the battery consumption and/or for load balancing, the UE may use lower modulation scheme such as altering from 1024QAM to 64QAM in the URLLC slice. Alternatively, or additionally, the UE may use lower power class such as altering from PC 1.5 to PC 3, turn off the MIMO function in the uplink, and/or use lower bandwidth, etc., in the URLLC slice.

In some examples, the UE may determine, at operation 1018, whether the current time is during the rush hours of the day. When the current time is not in the rush hours, the operation may return to 1014. When the current time falls in the rush hours, the UE may also alter the capabilities on a certain network slice and report the capability to the node B (at operation 1020). In some examples, the UE may use the advanced features of the capabilities on the certain network slice during the rush hours. For example, the UE may enable uplink MIMO to enhance the data transmission in the V2X slice. Alternatively, or additionally, the UE may further use carrier aggregation, higher power class, and/or higher bandwidth, etc., in the V2X slice during the rush hours. In some examples, the UE may configure a time period for the rush hours such as 6-8 AM and 5-7 PM, Monday through Friday.

As discussed herein, the UE may report the altering of the capabilities without waiting for an enquiry from the node B or requesting for an enquiry from the node B.

In some examples, a network component of the 5G core network may send a command to all the UEs on a certain network slice to alter the capabilities during the rush hours or under other conditions. In some examples, the network component may be implemented on the AMF and/or the NRF.

Although FIGS. 7-10 illustrate these processes in a step-by-step order, and these figures are explained in a step-by-step order as well, any of the steps of these example processes may be performed independently of other steps, in any order, and/or in parallel with other steps. Additionally, steps may be omitted from the example processes and/or replaced with other steps described herein.

Figure 11:
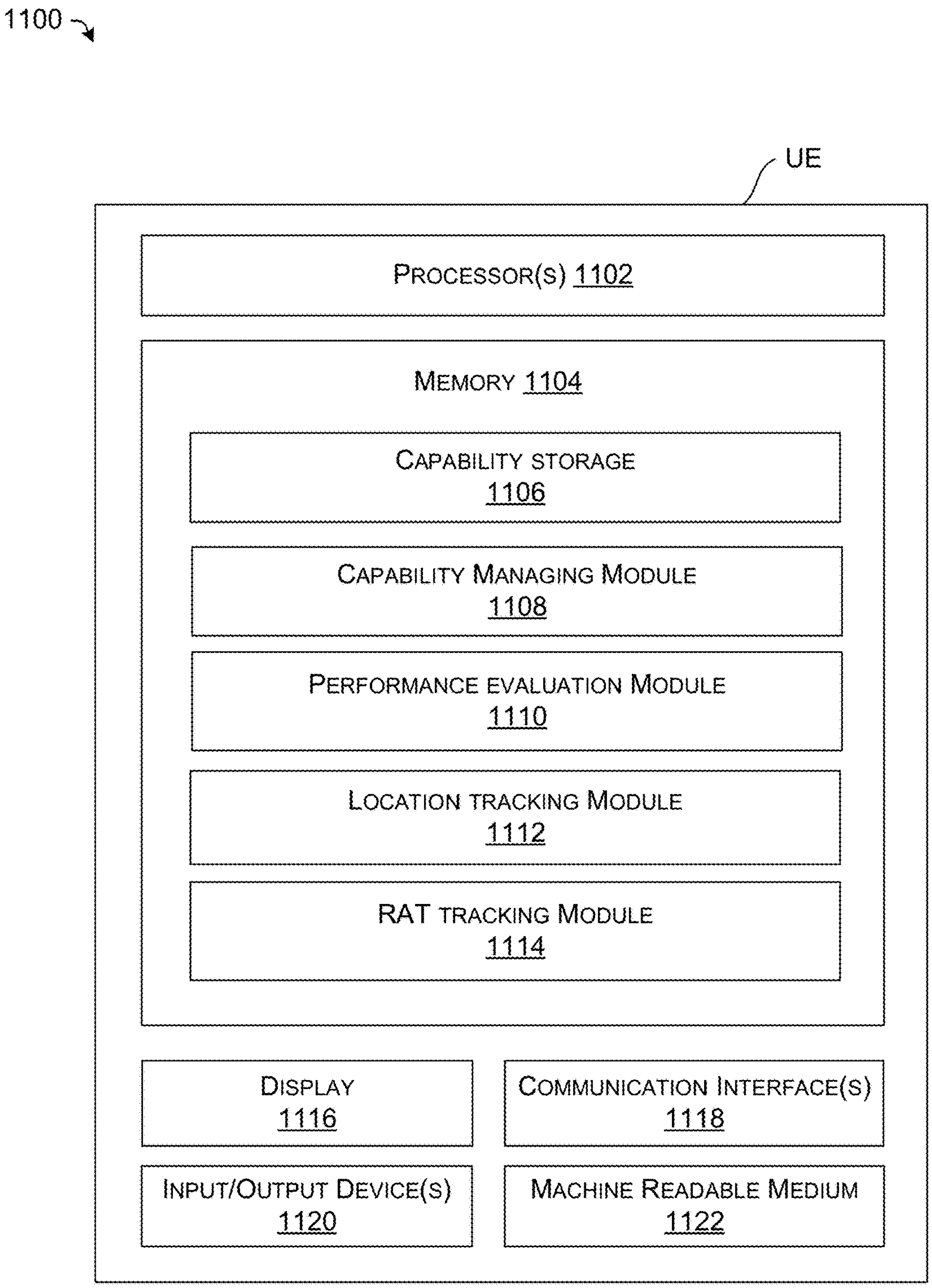
FIG. 11 illustrates an example user equipment (UE), in which methods for reporting UE capability are implemented, according to an example of the present disclosure.

FIG. 11 illustrates an example user equipment (UE), in which methods for reporting UE capability are implemented, according to an example of the present disclosure. The example UE 1100 may correspond to the UE 102(1) or UE 102(2), as illustrated in FIG. 1.

As illustrated in FIG. 11, a user equipment (UE) 1100 may comprise processor(s) 1102, a memory 1104 storing a capability storage 1106, a capability management module 1108, a performance evaluation module 1110, a location tracking module 1112, and a RAT tracking module 1114, a display 1116, communication interface(s) 1118, input/output device (s) 1120, and/or a machine readable medium 1122.

In various examples, the processor(s) 1102 can be a central processing unit (CPU), a graphics processing unit (GPU), or both CPU and GPU, or any other type of processing unit. Each of the one or more processor(s) 1102 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1102 may also be responsible for executing all computer applications stored in memory 1104, which can be associated with common types of volatile (RAM) and/or nonvolatile (ROM) memory.

In various examples, the memory 1104 can include system memory, which may be volatile (such as RAM), non-volatile (such as ROM, flash memory, etc.) or some combination of the two. The memory 1104 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 1100. Any such non-transitory computer-readable media may be part of the UE 1100.

The capability storage 1106 may be configured to store a set of UE capabilities of the UE 1100. In some examples, the set of capabilities of the UE 1100 may include EPS encryption algorithm (EPA) and EPS integrity algorithm (EIA) used for data encryption, supported features such as CloT, ProSe (D2D), DCNR, V2X etc. The set of UE capabilities may also indicate the RATs applicable to all supported carriers and carrier combinations. In some examples, the set of UE capabilities may further indicate the UE band capability and/or band combinations in downlink and uplink. In some examples, the set of UE capabilities may further indicate specific UE capabilities such as Evolved Universal Terrestrial Radio Access (EUTRA) capability, NR capability, multi-RAT dual connectivity (MRDC) capability, etc. In yet other examples, the set of UE capabilities may indicate modulation schemes supported in downlink and uplink. In yet other examples, the set of UE capabilities may include parameters associated with the antenna system such as MIMO, beamforming, etc. In yet other examples, the set of UE capabilities may indicate set of features related to radio protocols.

The capability management module 1108 may be configured to provide one or more capabilities to the Node B in response to an enquiry for UE capability. In some examples, the capability management module 1108 may voluntarily send an update of the capabilities to the Node B when certain conditions are triggered. In some other examples, the capability management module 1108 may alter the capabilities on a particular network slice and report the UE capabilities to a node B preemptively. When the UE operates on multiple network slices, the capability management module 1108 may alter the capabilities per slice and report the altered capabilities to the node B preemptively. In yet other examples, the capability management module 1108 may alter the capabilities upon receiving a command from a network component to alter the capabilities on a given network slice.

The performance evaluation module 1110 may monitor the data packet transmission and the control signal in downlink and uplink. The performance evaluation module 1110 may determine whether the communication is experiencing high packet loss rate and/or high block error rate. In some examples, the performance evaluation module 1110 may further determine whether the communication is experiencing low data throughput, frequent call drops, call setup failure, etc. Based on the conditions of the data packet transmission and control signal in downlink and uplink, the performance evaluation module 1110 may determine whether an update for UE capability is needed. When it is determined that an update for UE capability is needed, the performance evaluation module 1110 may generate a signal to the capability management module 1108, indicating a trigger condition may be satisfied. The signal may further include details of the monitored performance deterioration.

The location tracking module 1112 may be configured to track the geographic location of the UE 1100 using a global positioning system (GPS). In some examples, the location tracking module 1112 may provide the changes in the cell and/or the tracking area that the UE 1100 is associated with during the movement. When the movement of the UE 1100 causes a tracking area change, the location tracking module 1112 may generate a signal to the capability management module 1108, indicating a trigger condition may be satisfied.

The RAT tracking module 1114 may be configured to track the RAT the UE uses. When the RAT change is detected, particularly, from a high bandwidth to a low bandwidth, the RAT tracking module 1114 may generate a signal to the capability management module 1108, indicating a trigger condition may be satisfied.

The communication interface(s) 1118 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 1118 can be compatible with multiple radio access technologies, such as 5G radio access technologies and 4G/LTE radio access technologies. Accordingly, the communication interfaces 1118 can allow the UE 1100 to connect to the 5G system described herein.

Display 1116 can be a liquid crystal display or any other type of display commonly used in the UE 1100. For example, display 1116 may be a touch-sensitive display screen and can then also act as an input device or keypad, such as for providing a soft-key keyboard, navigation buttons, or any other type of input. Input/output device(s) 1120 can include any sort of output devices known in the art, such as display 1116, speakers, a vibrating mechanism, and/or a tactile feedback mechanism. Input/output device(s) 1120 can also include ports for one or more peripheral devices, such as headphones, peripheral speakers, and/or a peripheral display. Input/output device(s) 1120 can include any sort of input devices known in the art. For example, input/output device(s) 1120 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 1122 can store one or more sets of instructions, such as software or firmware, that embodies any one or more of the methodologies or functions described herein. The instructions can also reside, completely or at least partially, within the memory 1104, processor(s) 1102, and/or communication interface(s) 1118 during execution thereof by the UE 1100. The memory 1104 and the processor(s) 1102 also can constitute machine readable media 1122.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:
- establishing, on a user equipment (UE), network slices in a cellular network environment, the network slices corresponding to services requested by a user;
- receiving, at the UE, a first enquiry for capabilities from a base station;
- transmitting, by the UE, information associated with capabilities on a per-slice basis to the base station, with first information associated with first capabilities transmitted for a first network slice of the network slices and second information associated with second capabilities transmitted for a second network slice of the network slices, with the first capabilities and the second capabilities differing from each other;
- monitoring, at the UE, real-time conditions associated with the UE;
- determining, by the UE and based at least in part on the real-time conditions, that a condition associated with the UE has been triggered; and
- preemptively transmitting, based at least in part on the condition being triggered, from the UE to the base station, without awaiting a second enquiry from the base station, and without requesting to receive the second enquiry, updated capabilities for the first network slice and the second network slice.

2. The computer-implemented method of claim 1, further comprising:
- altering, by the UE, the first capabilities or the second capabilities; and
- transmitting, by the UE, a request to the base station to use the altered first capabilities or the altered second capabilities without awaiting or requesting the first enquiry from the base station.

3. The computer-implemented method of claim 1, further comprising:
- determining, by the UE, that a battery charge meets a criterion; and
- altering, by the UE, the first capabilities or the second capabilities to reduce battery consumption.

4. The computer-implemented method of claim 3, wherein altering, by the UE, the first capabilities or the second capabilities to reduce battery consumption includes at least one of:
- using a power class lower than a current power class on the first network slice or the second network slice,
- using a modulation scheme lower than a current modulation scheme on the first network slice or the second network slice,
- disabling antenna switching on the first network slice or the second network slice,
- disabling multiple input multiple output (MIMO) in an uplink on the first network slice or the second network slice, or
- disabling carrier aggregation on the first network slice or the second network slice.

5. The computer-implemented method of claim 3, wherein the battery charge meeting the criterion indicates that the battery charge is equal to or lower than a threshold.

6. The computer-implemented method of claim 1, further comprising:
- altering, by the UE, the first capabilities or the second capabilities in a preset time period to increase reliability of data packet transmission.

7. The computer-implemented method of claim 6, wherein altering, by the UE, the first capabilities or the second capabilities in the preset time period to increase the reliability of data packet transmission includes at least one of:
- using a bandwidth higher than a current bandwidth on the first network slice or the second network slice,
- enabling multiple input multiple output (MIMO) in an uplink on the first network slice or the second network slice,
- enabling carrier aggregation on the first network slice or the second network slice,
- using a power class higher than a current power class on the first network slice or the second network slice,
- using a modulation scheme higher than a current modulation scheme on the first network slice or the second network slice, or
- enabling antenna switching on the first network slice or the second network slice.

8. The computer-implemented method of claim 6, wherein the first network slice or the second network slice corresponds to a vehicle to anything (V2X) service.

9. The computer-implemented method of claim 1, further comprising:
- receiving, from a network component of the cellular network environment, a command to alter the first capabilities or the second capabilities, causing the UE and one or more second UEs operating on the first network slice or the second network slice to use altered capabilities on the first network slice or the second network slice.

10. A user equipment (UE) comprising:
- a processor,
- a network interface, and
- a memory storing instructions executed by the processor to perform actions including:
  - receiving network slices in a cellular network environment, the network slices corresponding to services requested by a user;
  - receiving a first enquiry for capabilities from a base station;
  - transmitting information associated with capabilities on a per-slice basis to the base station, with first information associated with first capabilities transmitted for a first network slice of the network slices and second information associated with second capabilities transmitted for a second network slice of the network slices, with the first capabilities and the second capabilities differing from each other;
  - monitoring real-time conditions associated with the UE;
  - determining, based at least in part on the real-time conditions, that a condition associated with the UE has been triggered; and
  - preemptively transmitting, based at least in part on the condition being triggered, to the base station, without awaiting a second enquiry from the base station, and without requesting to receive the second enquiry, updated capabilities for the first network slice and the second network slice.

11. The UE of claim 10, wherein the actions further include:

altering, by the UE, the first capabilities or the second capabilities; and transmitting a request to the base station to use the altered first capabilities or the altered second capabilities without awaiting or requesting the first enquiry from the base station.

12. The UE of claim 10, wherein the actions further include:

determining that a battery charge meets a criterion; and altering the first capabilities or the second capabilities to reduce battery consumption.

13. The UE of claim 12, wherein altering the first capabilities or the second capabilities to reduce battery consumption includes at least one of:

using a power class lower than a current power class on the first network slice or the second network slice, using a modulation scheme lower than a current modulation scheme on the first network slice or the second network slice, disabling antenna switching on the first network slice or the second network slice, disabling multiple input multiple output (MIMO) in an uplink on the first network slice or the second network slice, or disabling carrier aggregation on the first network slice or the second network slice.

14. The UE of claim 12, wherein the battery charge meeting the criterion indicates the battery charge is equal to or lower than a threshold.

15. The UE of claim 10, wherein the actions further include:

altering the first capabilities or the second capabilities in a preset time period to increase reliability of data packet transmission.

16. The UE of claim 15, wherein altering the first capabilities or the second capabilities in the preset time period to increase the reliability of data packet transmission includes at least one of:

using a bandwidth higher than a current bandwidth on the first network slice or the second network slice, enabling multiple input multiple output (MIMO) in an uplink on the first network slice or the second network slice, enabling carrier aggregation on the first network slice or the second network slice, using a power class higher than a current power class on the first network slice or the second network slice, using a modulation scheme higher than a current modulation scheme on the first network slice or the second network slice, or enabling antenna switching on the first network slice or the second network slice.

17. The UE of claim 15, wherein the first network slice or the second network slice corresponds to a vehicle to anything (V2X) service.

18. The UE of claim 10, wherein the actions further include:

receiving, from a network component of the cellular network environment, a command to alter the first capabilities or the second capabilities; and as a result of the command, using the first altered capabilities or the second altered capabilities, wherein the command is directed to the UE and one or more second UEs operating on the first network slice or the second network slice.

19. A non-transitory computer-readable storage medium storing computer-readable instructions, that when executed by a processor, cause the processor to perform actions comprising:

establishing, on a user equipment (UE), network slices in a cellular network environment, the network slices corresponding to services requested by a user;

receiving, at the UE, a first enquiry for capabilities from a base station;

transmitting, by the UE, information associated with capabilities on a per-slice basis to the base station, with first information associated with first capabilities transmitted for a first network slice of the network slices and second information associated with second capabilities transmitted for a second network slice of the network slices, with the first capabilities and the second capabilities differing from each other;

monitoring, at the UE, real-time conditions associated with the UE;

determining, by the UE and based at least in part on the real-time conditions, that a condition associated with the UE has been triggered; and preemptively transmitting, based at least in part on the condition being triggered, from the UE to the base station, without awaiting a second enquiry from the base station, and without requesting to receive the second enquiry, updated capabilities for the first network slice and the second network slice.

20. The non-transitory computer-readable storage medium of claim 19, wherein the actions further include:

altering, by the UE, the first capabilities or the second capabilities; and transmitting, by the UE, a request to the base station to use the first altered capabilities or the second altered capabilities without awaiting or requesting the first enquiry from the base station.

* * * * *